(12) United States Patent
Iwasaki et al.

(10) Patent No.: US 9,696,203 B2
(45) Date of Patent: Jul. 4, 2017

(54) SPECTRAL DATA PROCESSING APPARATUS, SPECTRAL DATA PROCESSING METHOD, AND RECORDING MEDIUM

(71) Applicant: CANON KABUSHIKI KAISHA, Tokyo (JP)

(72) Inventors: Kota Iwasaki, Atsugi (JP); Hidetoshi Tsuzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 14/307,913

(22) Filed: Jun. 18, 2014

(65) Prior Publication Data

US 2014/0379306 A1    Dec. 25, 2014

(30) Foreign Application Priority Data

Jun. 20, 2013  (JP) ................................. 2013-129224
May 13, 2014  (JP) ................................. 2014-099899

(51) Int. Cl.
*G01J 3/28*    (2006.01)

(52) U.S. Cl.
CPC ........... *G01J 3/28* (2013.01); *G01J 2003/283* (2013.01)

(58) Field of Classification Search
CPC .......................................................... G01J 3/28
USPC ........................................................... 702/199
See application file for complete search history.

(56) References Cited

U.S. PATENT DOCUMENTS

| 6,675,106 B1* | 1/2004 | Keenan ..................... G01J 3/28 |
| | | 702/194 |
| 2008/0154549 A1* | 6/2008 | Koshoubu ............ G06K 9/0051 |
| | | 702/191 |

FOREIGN PATENT DOCUMENTS

| JP | 10-96691 A | 4/1998 |
| JP | 2011-174906 A | 9/2011 |
| JP | 2011-196853 A | 10/2011 |

\* cited by examiner

*Primary Examiner* — Bryan Bui
(74) *Attorney, Agent, or Firm* — Canon U.S.A. Inc., IP Division

(57) ABSTRACT

A spectral data processing apparatus includes an analyzer configured to perform principal component analysis of spectral data acquired for each of a plurality of regions of a sample, wherein the analyzer obtains an eigenvector by performing the principal component analysis of first spectral data of a first region out of the plurality of regions, and performs the principal component analysis of second spectral data of a second region different from the first region out of the plurality of regions using the obtained eigenvector.

10 Claims, 6 Drawing Sheets

SPECTRAL DATA PROCESSING APPARATUS, SPECTRAL DATA PROCESSING METHOD, AND RECORDING MEDIUM

BACKGROUND

Field

This disclosure relates to a spectral data processing apparatus configured to perform principal component analysis of spectral data, and a spectral data processing method.

Description of the Related Art

In the medical field, an observation of biological sample in an enlarged scale using a microscope is widely performed. The biological sample is prepared by slicing a biological tissue. However, since the sample substantially has no color and is transparent, dyeing is performed in many cases.

The biological tissue includes multiple types of substances. Therefore, in order to detect a difference in composition or chemical conditions of these substances, measurement of spectrum (such as ultraviolet spectroscopy, visible spectroscopy, X-ray spectroscopy, Raman spectroscopy, induced Raman spectroscopy, coherent anti-Stokes Raman spectroscopy, infrared absorption spectroscopy, and mass spectrometry) of the biological sample is performed. In particular, an observation method using image information of the biological sample and a spectral apparatus configured to measure the spectrum corresponding thereto is referred to as a spectroscopic imaging method. With this observation method, information such as form, composition, and chemical state of the substances is acquired without dying the biological sample.

As a method for analyzing spectral data including the spectrum, multivariate analysis which treats information on intensity in a wide wavelength region as variable quantities is employed. According to principal component analysis or independent component analysis as a type of the multivariate analysis, even though the spectrum is complicated because vibration spectra or band structures of the respective components included in the biological sample are superimposed, classification or measurement of the chemical state of the biological sample are enabled. Japanese Patent Laid-Open No. 2011-174906 discloses a method of inspecting form information or composition of biological samples by performing principal component analysis of spectrum from pixel to pixel basis, and obtaining distribution of principal component scores.

In observation of the biological sample, observation of a region of a cell size at a high magnification, and observation of a region of a larger tissue size are required. Therefore, in Japanese Patent Laid-Open No. 2011-196853, a region of the tissue size is divided into a plurality of regions (tiles) and enlarged images are acquired for the regions using a microscope with a large magnification. By combining the acquired plurality of enlarged images (tiling), an entire image is created, and the created entire image is observed.

When performing principal component analysis on the spectral data, an eigenvector is applied to the spectrum to obtain a principal component score. Japanese Patent Laid-Open No. 2011-174906 discloses a method of obtaining an eigenvector of a standard sample whose component is known in advance, and using the eigenvector in the principal component analysis on the spectral data. However, when an unknown component is included in the sample, the eigenvector may not be an appropriate vector, and hence the accuracy of the principal component analysis may be insufficient in some cases.

The eigenvector is obtained by solving a high-order such as several tens or hundreds order eigenvalue problem by using a variance-covariance matrix with respect to the spectroscopic spectra of the plurality of pixels which constitute tiles. Therefore, when eigenvectors are obtained for all of the spectral data acquired from each tile, a long time is required for image processing.

From such circumstances, when an attempt is made to acquire the entire image of the sample, it is not easy to obtain appropriate eigenvectors quickly, and there arises a problem that principal component analysis on the spectral data takes a long time.

SUMMARY

An apparatus according to an aspect of this disclosure is a spectral data processing apparatus including: an analyzer configured to perform principal component analysis of spectral data acquired for each of a plurality of regions of a sample. The analyzer obtains an eigenvector by performing the principal component analysis of first spectral data of a first region out of the plurality of regions, and performs the principal component analysis of second spectral data of a second region different from the first region out of the plurality of regions using the obtained eigenvector.

Further features of the present disclosure will become apparent from the following description of exemplary embodiments with reference to the attached drawings.

DESCRIPTION OF THE EMBODIMENTS

First Embodiment

Figure 1A:
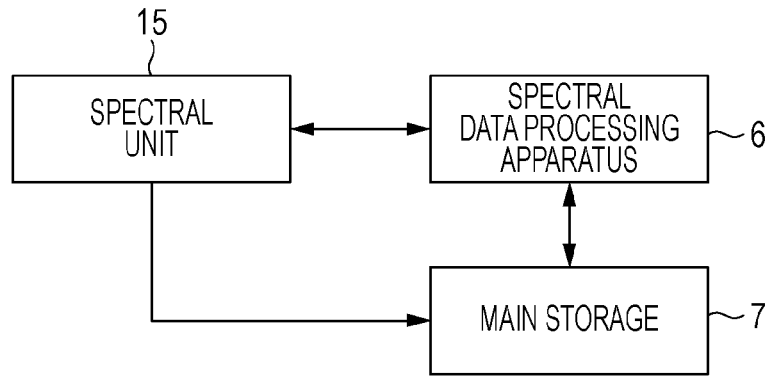
FIG. 1A is a block diagram of a spectral apparatus of the first embodiment.
Figure 1B:
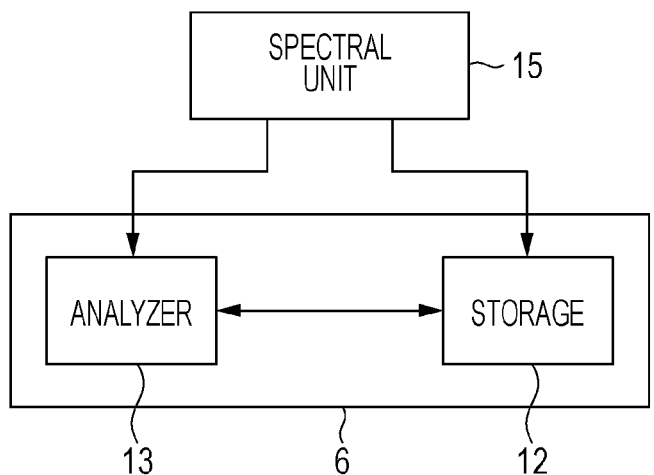
FIG. 1B is a functional block diagram of a spectral data processing apparatus of the first embodiment.

Referring to FIG. 1A and FIG. 1B, a configuration of a spectral apparatus according to a first embodiment will be described. FIG. 1A is a block diagram of a spectral apparatus according to this embodiment. The spectral apparatus of this embodiment is a spectral apparatus to which a spectroscopic imaging method is applicable. The spectral apparatus includes a spectral unit 15, a spectral data processing apparatus 6, and a main storage 7.

The spectral unit 15 is a part configured to divide a sample into a plurality of regions and measure spectral data for each region. The spectral data processing apparatus 6 is a part that processes spectral data acquired by the spectral unit 15 and, specifically, is a computer including a CPU, a memory, and a storage device. The spectral data processing apparatus 6 is connected to the spectral unit 15. The main storage 7 is a part that stores the spectral data acquired by the spectral unit 15, and is an external storage device such as a hard disk.

In this specification, a plurality of spectra associated with positional information of the respective tiles and the respective pixels in the respective tiles are collectively referred to as "spectral data". In this embodiment, absorbing spectrum of the sample is used as spectrum as an example.

Figure 2:
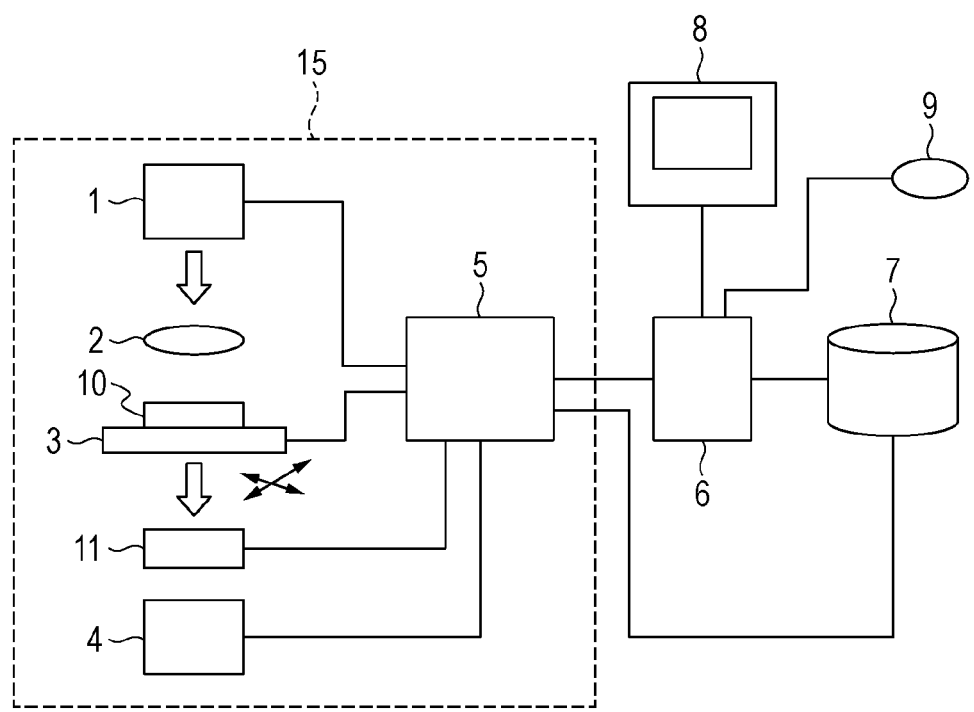
FIG. 2 is an explanatory drawing illustrating a configuration of the spectral apparatus of the first embodiment.

Detailed configuration of the spectral apparatus of this embodiment is illustrated in FIG. 2. The spectral unit 15 includes a light source 1, an optical system 2, a stage 3, a detector 4, a control unit 5, and a spectroscopic element 11. The control unit 5 is connected to the spectral data processing apparatus 6 and the main storage 7.

The light source 1 radiates electromagnetic waves for performing spectral measurement on a sample 10. The light source 1 may be a wavelength-tunable light source in which a wavelength of electromagnetic waves is changeable, or a light source that radiates an electromagnetic wave in a large bandwidth. Specifically, a halogen lamp, a deuterium lamp, an infrared lamp, a laser, X-ray tube, a light-emitting diode and the like are exemplified. Two or more same or different types of light sources may be combined for use. The bandwidth of the electromagnetic wave may be that of a microwave, a terahertz wave, an infrared ray, visible light, an ultraviolet ray, a vacuum ultraviolet ray, or an X-ray. The sample 10 of this embodiment is a biological sample.

The optical system 2 is a part that introduces the electromagnetic wave emitted from the light source 1 to the sample 10. The electromagnetic wave emitted from the light source 1 is converged by the optical system 2 and enters the sample 10.

The stage 3 is a part on which the sample 10 is disposed, and the region for measurement may be changed as needed by moving the stage 3. The motion of the stage 3 is controlled by the control unit 5.

The detector 4 is a part that detects the electromagnetic wave having passed through the sample 10. Area sensors of CCD or CMOS type may be used as the detector 4. In this embodiment, one tile is a region that the detector 4 can detect per operation, and the sample 10 is divided into a plurality of tiles each of which is measured. Each tile includes a plurality of pixels in accordance with the number of effective pixels of the detector.

The spectroscopic element 11 is arranged between the detector 4 and the sample 10. When a light source configured to emit an electromagnetic wave on a wide band is employed as the light source 1, spectrum can be measured by changing the wavelength of the electromagnetic wave passing through the spectroscopic element 11. When the light source 1 is of a wavelength tunable type, the spectroscopic element 11 is not used, and measurement is performed while tuning the wavelength.

The control unit 5 is a part that performs control of the stage 3 or other components and acquisition of the positional coordinates of the respective tiles and positional information of the respective pixels and, more specifically, is a computer including a CPU, a memory, and a storage device. Examples of the positional information of the respective tiles include positional coordinates indicating the position of the stage 3 that is controlled by the control unit 5, a given position on the sample 10, and a relative position from the given tile.

Figure 3A:
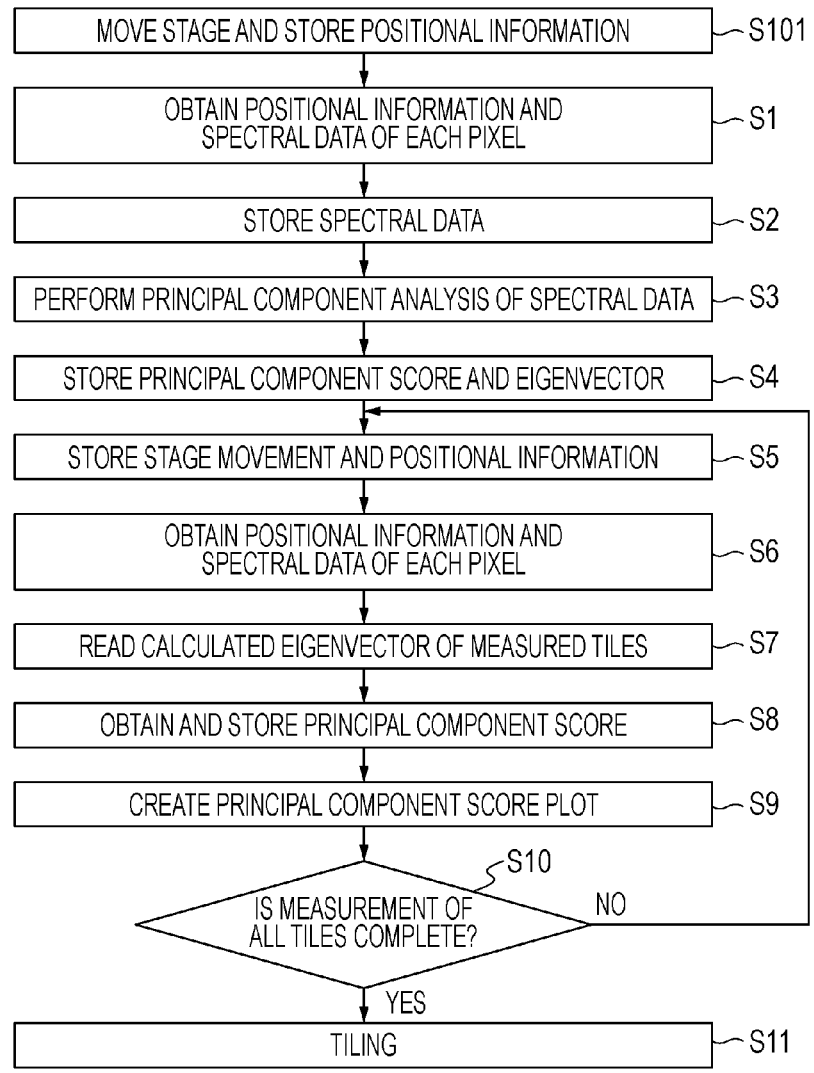
FIG. 3A is a flowchart of a spectral data processing method of the first embodiment.

A memory of the control unit 5 stores a program corresponding to Steps S101 to S2 of the spectral data processing method illustrated in FIG. 3A, and the respective processes are performed by the CPU reading the program and executing the program. In this embodiment, the control unit 5 and the spectral data processing apparatus 6 are composed of separate computers. However, the control unit 5 and the spectral data processing apparatus 6 may be composed of a single computer. In this case, the computer stores a program corresponding to Steps S101 to S11 of the spectral data processing method of this embodiment illustrated in FIG. 3A, and the respective processes are performed by the CPU reading and executing the program.

With the configuration described above, the spectrum of the respective pixels is acquired by detecting the electromagnetic wave having passed through the sample 10. The positional information of each tile and each pixel on the sample 10 is acquired, and is related to each corresponding spectrum. The above described spectrum may be an absorbing spectrum, a fluorescent spectrum, a Raman spectrum, and an X-ray spectrum. In addition, a light source that emits electromagnetic waves having two or more wavelengths is applicable to acquisition of induced Raman spectrum or coherent anti-Stokes Raman spectrum.

The spectral data obtained in this manner is sent from the control unit 5 to the main storage 7 and stored in the main storage 7.

The spectral data is sent from the control unit 5 to the spectral data processing apparatus 6. The spectral data processing apparatus 6 receives the spectral data acquired for each region (tile) and performs the principal component analysis.

A display unit 8 and an instruction unit 9 are connected to the spectral data processing apparatus 6. The display unit 8 is a display. The spectral data processing apparatus 6 displays an image of the sample 10 created by the spectral data processing apparatus 6 on the display unit 8. The instruction unit 9 is a part to which an instruction from the user is input, and includes a keyboard and a mouse.

The configuration of the spectral data processing apparatus 6 and the spectral data processing method will be described in detail. A functional block diagram of the spectral data processing apparatus of this embodiment is illustrated in FIG. 1B. As illustrated in FIG. 1B, the spectral data processing apparatus 6 includes an analyzer 13 and a storage 12. More specifically, the CPU includes a function of the analyzer 13, and the memory or the storage device includes a function of the storage 12.

The analyzer 13 performs a principal component analysis of the spectral data. More specifically, part or all of the pixels in one tile are subjected to principal component analysis of the spectral data. The storage 12 is a part that stores eigenvectors obtained in the course of the principal component analysis.

A spectral data processing method by the spectral data processing apparatus 6 will be described with reference to FIGS. 3A and 3B. FIG. 3A is a flowchart of a spectral data processing method of this embodiment. A memory of the spectral data processing apparatus 6 stores a program corresponding to Steps 3 to S11 of the spectral data processing method illustrated in FIG. 3A, and the respective processes are performed by the CPU reading the program and executing the program.

First, the spectral unit 15 of the spectral apparatus acquires spectral data of the respective tiles. More specifically, the control unit 5 moves the stage 3 so that measurement of a given region on the sample is enabled, and the positional information of this region is stored in the main storage 7 (S101). For the sake of easy explanation, this region is referred to as a first tile (first region). Subsequently, the control unit 5 acquires the spectrum of each pixel of the first tile from the result of detection of the detector 4 (S1), and stores the acquired spectrum as the spectral data in the main storage 7 together with the positional information of each pixel (S2). The spectral data stored in the main storage 7 (the first spectral data) is sent to the analyzer 13 of the spectral data processing apparatus 6.

The analyzer 13 receives the first spectral data, and performs the principal component analysis of the spectral data of part or all of the pixels in the first tile (S3). The eigenvector is calculated by the variance-covariance matrix so as to maximize dispersion of the principal component scores when the principal component analysis is performed. The eigenvector calculated by the analyzer 13 by performing the principal component analysis of the first spectral data is stored in the storage 12 (S4).

The analyzer 13 acquires the principal component scores by using the calculated eigenvector. A first to n-th principal component scores are obtained as the principal component scores. A plurality of principal component scores are obtained in accordance with the number of data to be used for the principal component analysis on the respective principal components, that is, in accordance with the number of pixels. The obtained principal component scores are stored in the storage 12 together with the positional information of the respective pixels (S4).

Subsequently, the control unit 5 moves the stage 3 so as to allow measurement of a second tile (second region) different from the first tile on the sample 10, and acquires the positional information thereof. The acquired positional information is stored in the main storage 7 (S5). Subsequently, the control unit 5 acquires spectral data on the second tile (second spectral data) and stores the acquired spectral data in the main storage 7 together with the positional information (addresses) of the respective pixels (S6). Although the second tile is described to be a different region from the first tile, the first tile and the second tile may include partly the same region.

The analyzer 13 performs the principal component analysis of the second spectral data in the procedure different from that of the first tile. Specifically, calculation of the eigenvector by the variance-covariance matrix is not performed and the principal component analysis is performed by using the eigenvector calculated by performing the principal component analysis of the first spectral data which is data of the measured tile. The analyzer 13 reads the eigenvector stored in the storage 12 (S7), performs the principal component analysis by using the read eigenvector, and obtains the principal component scores. The obtained principal component scores are stored in the storage 12 (S8).

Subsequently, a principal component score plot is created in which the principal component scores of the respective tiles are plotted by using the principal component scores obtained by the spectral data processing apparatus 6 and the positional information of the respective pixels (S9). Creation of the principal component score plot may be performed collectively after measurement of all the tiles has been completed.

In Step S10, the control unit 5 determines whether measurement of all of the tiles on the sample has been completed. If the measurement is not completed, the processes from Steps S5 to S9 are repeated. When measurement of all of the tiles has been completed, the spectral data processing apparatus 6 tiles a plurality of principal component score plots on the basis of the positional information of the respective tiles, and creates an entire image of the sample 10 (S11). The acquired entire image is fed from the spectral data processing apparatus 6 to the display unit 8, and is displayed on the display unit 8.

Figure 4A:
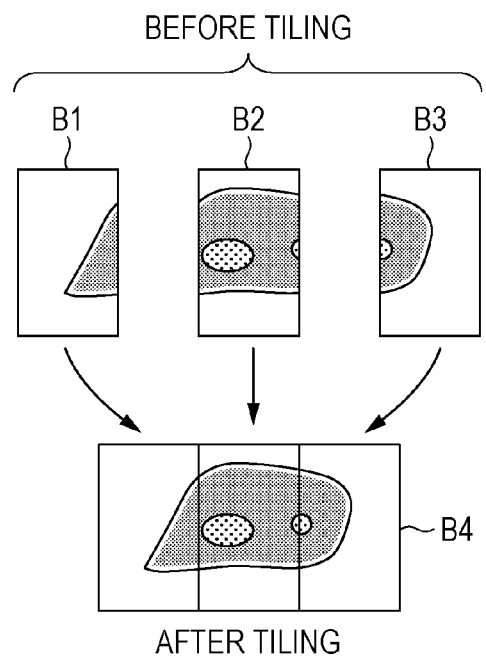
FIG. 4A is a schematic drawing of a principal component score plot and an entire image of the first embodiment.
Figure 4B:
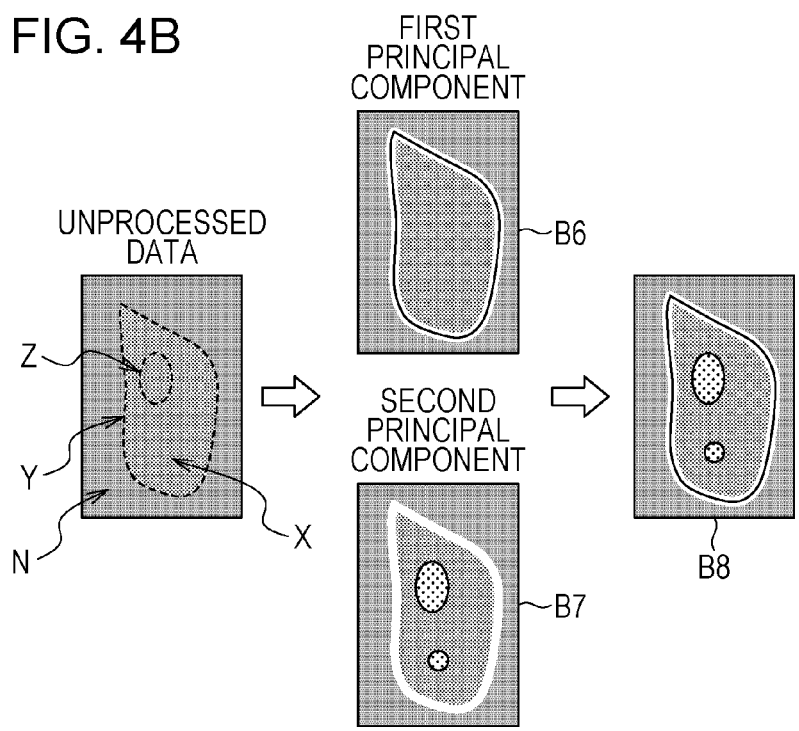
FIG. 4B is an explanatory drawing of the principal component score plot of the first embodiment.

Referring to FIG. 4A and FIG. 4B, creation of the principal component score plots and tiling will be described. FIG. 4A is a schematic drawing illustrating the principal component score plots and the entire image, and FIG. 4B is an explanatory drawing of the principal component score plot.

FIG. 4A illustrates an example of the case where the sample 10 is divided into three tiles. The principal component scores obtained for the respective tiles are plotted on the basis of the positional information of the pixels, whereby the principal component score plots B1, B2, and B3 of the respective tiles are created. Subsequently, by tiling the three principal component score plots, the entire image B4 of the sample 10 is created.

The acquired entire image is created by using a given principal component score from a plurality of principal component scores. In FIG. 4B, an image B6 of a first principal component score and an image B7 of a second principal component score are created, and these images are superimposed to create the entire image B8. In this manner, creating the entire image by superimposing the principal component score plots creased by using a plurality of different principal component scores achieves effective expression of relationships between the respective principal component scores. The principal component scores to be used in creation of the image may be set by the user from the instruction unit 9.

Figure 3B:
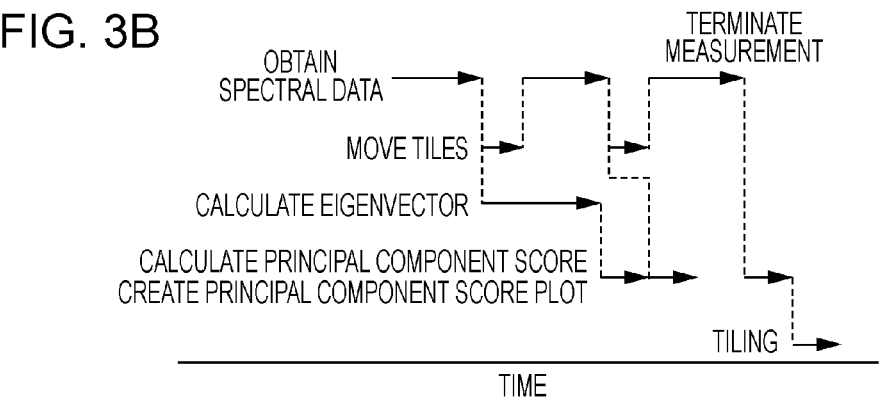
FIG. 3B is an explanatory drawing illustrating timings of respective processes in the spectral data processing method of the first embodiment.

FIG. 3B illustrates timings at which the spectral data processing apparatus 6 performs respective processes in the spectral data processing method. In this embodiment, when the principal component analysis is performed for the spectral data, an eigenvector obtained before is used instead of acquiring the eigenvector for each tile.

Figure 6A:
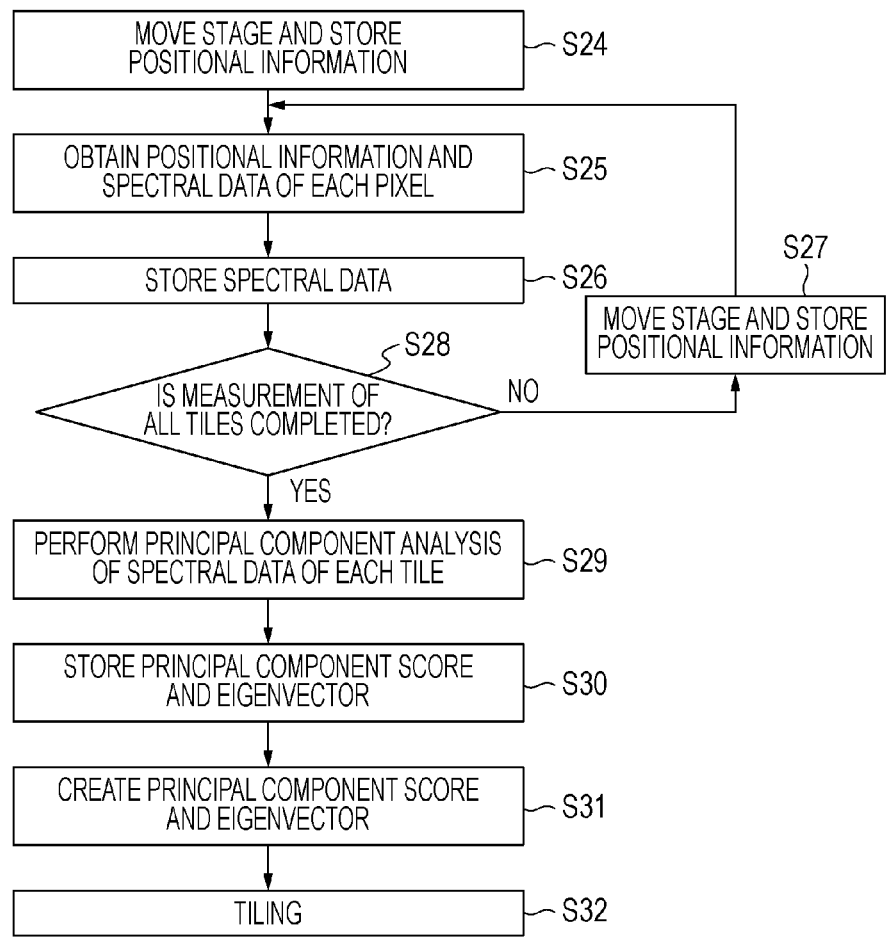
FIG. 6A is a flowchart of a spectral data processing method for a spectral apparatus of the related art.
Figure 6B:
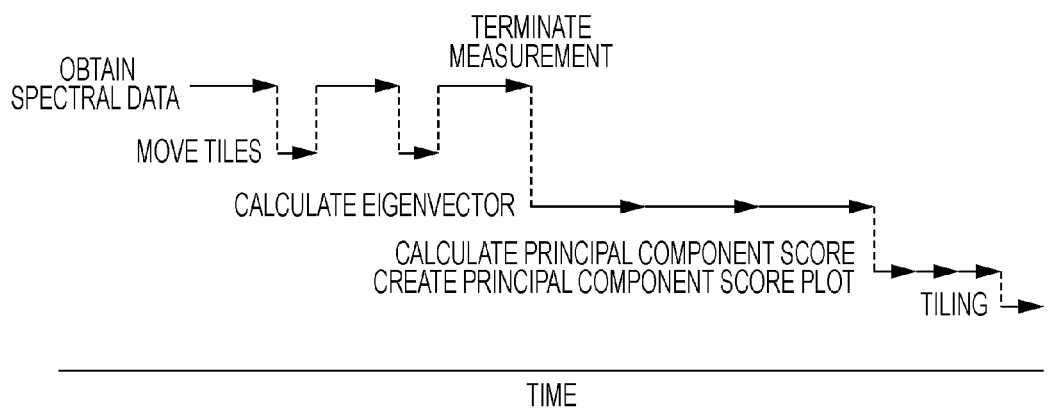
FIG. 6B is an explanatory drawing illustrating timings of respective processes in the spectral data processing method of the related art.

Here, for comparison, a spectral data processing apparatus to which this embodiment is not applied will be reviewed. FIG. 6A illustrates a flowchart relating to a spectral data processing apparatus according to the related art, and FIG. 6B illustrates timings of the respective processes of the spectral data processing. Spectral data acquiring time, tile motion time, eigenvector acquiring time, principal component score acquiring time, and principal component score plot generating time of each tile are considered to be the same between the spectral apparatus of the related art and the spectral apparatus of this embodiment.

In the case where this embodiment is not applied, the eigenvector is obtained for each spectral data. Specifically, in Steps S24 to S26, spectral data of tiles are obtained as in Steps S101 to S2 (FIG. 3A) of this embodiment. Whether the measurement of all the tiles is completed is determined in Step S28 and, if not, the region of measurement is changed (S27), and the procedure goes back to Step S25, and spectral data is obtained. When measurement of all the tiles is complete, principal component analysis is performed (S29), and eigenvectors and the principal component scores of the respective tiles are obtained (S30).

In contrast, in this embodiment, when the principal component analysis is performed for the spectral data, an eigenvector obtained before is used and therefore the number of acquiring of eigenvectors can be reduced. Consequently, high-order matrix calculation need not to be performed every time eigenvector is obtained, and hence the time required for performing the principal component analysis is reduced, and the time required for acquiring an image of the sample is reduced.

In this embodiment, the principal component analysis is performed by acquiring the eigenvector from the result of measurement of the sample. Therefore, an eigenvector more appropriate than in the case where a standard sample is used can be used, so that principal component analysis with high accuracy is enabled.

The eigenvector to be used when the principal component analysis of the second spectral data is performed may be the eigenvector obtained from the spectral data of the tile measured first, or may be those obtained from any other tiles. Alternatively, an average value of the eigenvectors obtained from the spectral data of a plurality of tiles is also applicable. Since the eigenvector changes depending on the composition or the state of the sample, the accuracy of the principal component analysis is improved by using the average value.

In addition, a method of using an eigenvector obtained from the spectral data of one or a plurality of tiles adjacent to the second tile is also applicable. As a method of performing principal component analysis by always using eigenvectors of the adjacent tiles, a method of setting in advance a tile the eigenvector of which is calculated and a tile the eigenvector of which is not calculated. In this case, all the tiles adjacent to the tile the eigenvector of which is not calculated are set to be tiles the eigenvectors of which are calculated.

By setting in the manner described above, when principal component analysis of the spectral data is performed, any of the tiles the eigenvector of which is not calculated may always use the eigenvector of the adjacent tile. Since the eigenvectors of all of the surrounding adjacent tiles are known, a process with a high degree of accuracy using more appropriate eigenvectors is enabled by performing the principal component analysis with the average value thereof.

Second Embodiment

Figure 1C:
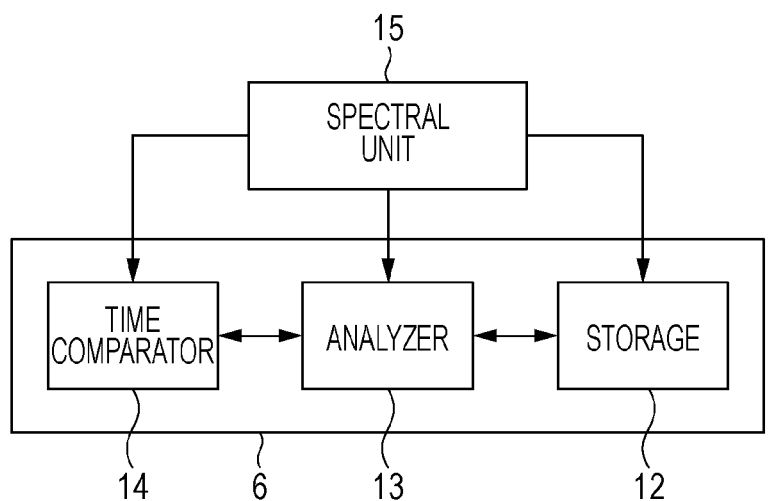
FIG. 1C is a block diagram of a spectral apparatus and a spectral data processing apparatus of a second embodiment.

A spectral apparatus having a form different from the first embodiment will be described with reference to FIG. 1C and FIG. 5. Description of parts common to the first embodiment described above will be omitted.

The spectral apparatus of this embodiment is different in configuration of the spectral data processing apparatus 6 from the first embodiment. The spectral data processing apparatus 6 of the first embodiment includes the storage 12 and the analyzer 13. However, in this embodiment, the spectral data processing apparatus 6 additionally includes a time comparator 14. In other words, the spectral data processing apparatus of this embodiment is a computer including a CPU, a memory, and a storage device, and the CPU has a function of the storage 12, the analyzer 13, and the time comparator 14. A memory of the spectral data processing apparatus stores a program corresponding to Steps S14 to S23 illustrated in FIG. 5A, and respective processes are performed by the CPU reading and executing the program.

Figure 5A:
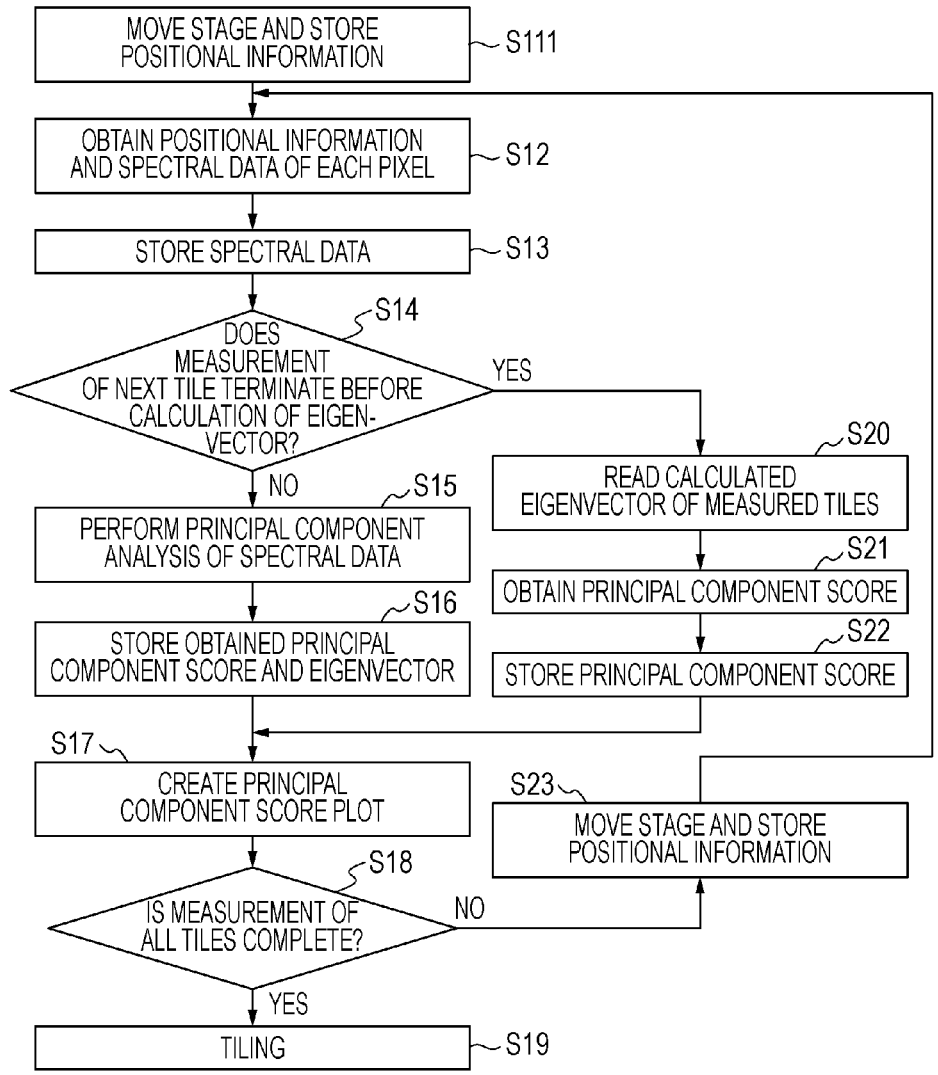
FIG. 5A is a flowchart of a spectral data processing method of a second embodiment.
Figure 5B:
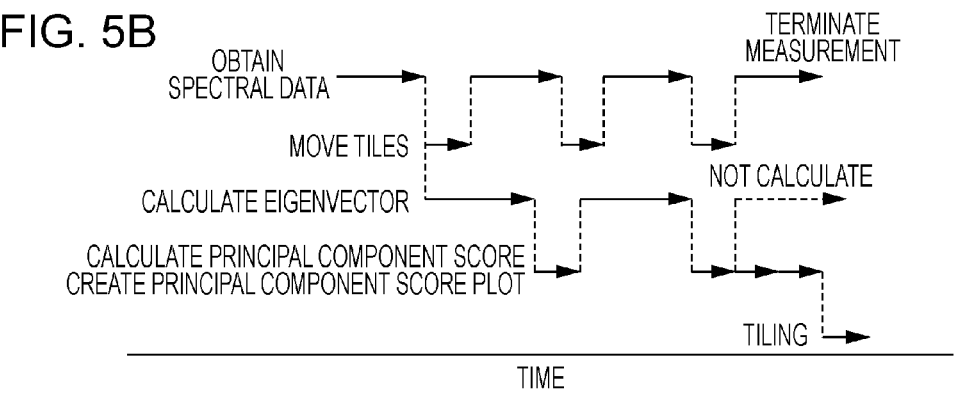
FIG. 5B is an explanatory drawing illustrating timings of respective processes in the spectral data processing method of the second embodiment.

A flowchart of the spectral apparatus of this embodiment is illustrated in FIG. 5A. As illustrated in FIG. 5A, the control unit 5 moves the stage 3 to a position at which measurement of the second tile (second region) is allowed, and stores the positional information thereof in the main storage 7 (S111). Subsequently, the control unit 5 acquires spectral data (second spectral data) of the second tile from the result of detection by the detector 4 (S12), and stores the acquired spectral data in the storage 12 (S13).

The time comparator 14 compares a required time Ti and a required time Te (S14). The required time Ti is a required time from the termination of acquisition of the second spectral data to the termination of acquisition of the spectral data of a third tile. The required time Te is a required time from the termination of acquisition of the second spectral data through the execution of the principal component analysis of the second spectral data until the termination of acquisition of the eigenvector. The third tile described above is a tile to be measured immediately after the measurement of the second tile. The required times Ti and Te may be a predetermined time or, alternatively, time required for acquiring the spectral data actually by the time comparator 14 or time required for calculating the eigenvector may be measured. The third tile is not limited to the tile to be measured immediately after the measurement of the second tile, and only needs to be a tile to be measured after the measurement of the second tile.

First, a process to be performed when Ti is shorter than Te, that is, when calculation of the eigenvector of the second spectral data is estimated to continue after the acquisition of the spectral data of the third tile is complete is described. In this case, the analyzer 13 performs the principal component analysis of the second spectral data by using the eigenvector obtained from the first spectral data acquired before (the calculated eigenvector of the measured tile) (S20, S21). The obtained principal component scores are stored in the storage 12 (S22).

When Ti is longer than Te, that is, when the calculation of the eigenvector of the second spectral data is estimated to terminate before the completion of the measurement of the third tile, the analyzer 13 performs the principal component analysis of the second spectral data to obtain the eigenvector and the principal component scores (S15). The obtained eigenvector and principal component scores are stored in the storage 12 (S16). The control unit 5 reads the principal component scores obtained by the spectral data processing apparatus, and creates a principal component score plots on the basis of the positional information of the pixels (S17).

When Ti is equal to Te, that is, when acquisition of the spectral data of the third tile and calculation of the eigenvector of the second spectral data are estimated to be completed at the same time, the processes from Steps S15 to S17 are performed as well.

Subsequently, whether the measurement of all the tiles is completed is determined by the control unit 5 (S18) and, if the measurement is not complete, the procedure goes back to Step S11, and the processes described above are repeated. When measurement of all the tiles is completed, the tiling is performed by the spectral data processing apparatus 6 to create an entire image of the sample (S19).

The eigenvector used in Step S21 may be an eigenvector obtained from the spectral data of the tile measured at the beginning as a first tile, or may be an eigenvector in a case where a given tile different from the tile measured at the beginning is determined as the first tile. An eigenvector obtained from the spectral data of the tile measured immediately before the measurement of the second tile or an eigenvector of the tile adjacent to the second tile may also be applicable. Furthermore, it is also possible to obtain an eigenvector from the spectral data of a plurality of tiles and obtain an average value thereof for use.

In this embodiment, the time comparator 14 compares the required time Te for the calculation of the eigenvector and the required time Ti for measurement of the next tile, and determines whether the eigenvector obtained before is used depending on the result. When the required time Te is longer, the analyzer 13 does not calculate the eigenvector, and obtains the principal component scores by using the eigenvector stored in the storage. With this configuration, the time required for a principal component analysis of the spectral data may be reduced, and time required for acquiring the entire image of the sample may be reduced.

When the required time Te is shorter, or when the required time Te and the required time Ti are equal, the eigenvector required from the obtained spectral data may be used to obtain the principal component scores. Therefore, principal component analysis with a higher degree of accuracy is enabled.

This disclosure is not limited to this embodiment. The time comparator 14 may have a configuration in which a required time Ta from the termination of acquisition of the second spectral data until the termination of acquisition of the spectral data of all the tiles is compared with the required time Te. The required time Ta is specifically a required time from the termination of acquisition of the second spectral data to the termination of acquisition of the spectral data of a tile the spectral data of which is acquired at the end. In other words, the above-described third tile is determined to be a tile the spectral data of which is acquired at the end and the required time Ta is used as the required time Ti.

When Ta is shorter than Te, that is, when the calculation of the eigenvector is estimated to continue even after the termination of acquisition of the spectral data of the last tile, the analyzer 13 performs principal component analysis of the second spectral data by using the eigenvector obtained from the first spectral data.

When Ta is longer than Te, that is, when the calculation of the eigenvector of the second spectral data is estimated to terminate before the completion of the measurement of the last tile, the analyzer 13 performs the principal component analysis of the second spectral data to obtain the eigenvector and the principal component scores. When Ti and Te are equal, the analyzer 13 performs the principal component analysis of the second spectral data and acquires the eigenvector and the principal component scores as well.

When using this method, the later the order of acquisition of the spectral data of a tile, the higher the probability that the calculation of the eigenvector of the tile is not performed. Therefore, it is desirable to start acquisition of the spectral data from the region which is considered that effective data is obtained therein. For example, a method of acquiring the spectral data from a tile at the center or near the center of the sample to outward tiles thereof, such as drawing a circle is conceivable. This case is based on the presumption that the probability of the tiles on the outermost periphery including effective information is low.

If a region other than the center region is the region of the sample having a high probability that effective information is included, a configuration may be employed in which the region is specified and the acquisition of spectral data is performed from the specified region to outward regions like drawing a circle. In this configuration, time required for the principal component analysis of the spectral data may be reduced, and the principal component analysis using more appropriate eigenvectors is enabled.

When acquiring the principal component scores without calculating the eigenvector, an eigenvector obtained from the tile spatially or temporally close or an eigenvector obtained from the spectral data of a wider region including the tile is preferably used. Consequently, principal component analysis with a higher degree of accuracy is enabled.

Other Embodiments

Additional embodiments of the present disclosure can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the embodiments described above, the spectral apparatus includes the main storage 7. However, the main storage 7 may be omitted if not necessary. As a method of storing various data in the main storage 7 or in the storage 12 of the spectral data processing apparatus, a method of storing the data in external memory connected to the respective apparatuses, or a method of storing various data by using the network may be used.

In the description of the above-described embodiments, the CPU is used for arithmetic processing or data processing, and the memory is used as the storage area for the program. However, this disclosure may be realized by hardware instead, by providing an arithmetic processing board on the spectral data processing apparatus and using a processor or a buffer memory in the arithmetic processing board. Furthermore, in the embodiments described above, the absorbing spectrum of a biological sample is used as the spectral data, and the principal component analysis, which is an example of multivariate analysis, is applied. However, this disclosure may be applied to the spectral data acquired not only by using the biological sample, but by using other samples. The spectral data is not limited to data based on the absorbing spectrum, and this disclosure may be applied to spectral data acquired by other spectroscopic methods.

This application claims the benefit of Japanese Patent Application No. 2013-129224, filed Jun. 20, 2013 and Japanese Patent Application No. 2014-099899, filed May 13, 2014, which are hereby incorporated by reference herein in their entirety.

What is claimed is:

1. A spectral data processing apparatus comprising:
an analyzer configured to perform principal component analysis of spectral data acquired for each of a plurality of regions of a sample,
the analyzer obtaining an eigenvector by performing the principal component analysis of first spectral data of a first region out of the plurality of regions, and performing the principal component analysis of second spectral data of a second region different from the first region out of the plurality of regions using the obtained eigenvector; and
a time comparator configured to compare a required time Te from the termination of acquisition of the second spectral data until acquisition of an eigenvector by performing the principal component analysis of the second spectral data and a required time Ti from the termination of acquisition of the second spectral data until the termination of acquisition of spectral data of a third region different from the first and second regions, wherein
the analyzer performs the principal component analysis of the second spectral data by using the eigenvector obtained by performing the principal component analysis of the first spectral data in a case where Te is longer than Ti, and performs the principal component analysis of the second spectral data by using the eigenvector obtained by performing the principal component analysis of the second spectral data in a case where Te is shorter than Ti or in a case where Te and Ti are equal.

2. The spectral data processing apparatus according to claim 1, wherein the analyzer performs the principal component analysis of the second spectral data by using an average value of the eigenvector and at least one eigenvector obtained by using spectral data in a region different from the first and second regions.

3. The spectral data processing apparatus according to claim 1, wherein the first region is a region in which acquisition of the spectral data is performed immediately before acquisition of the second spectral data.

4. The spectral data processing apparatus according to claim 1, wherein the first region is adjacent to the second region.

5. The spectral data processing apparatus according to claim 4, wherein the analyzer performs the principal component analysis of the second spectral data by using an average value of the eigenvector and at least one eigenvector obtained by using spectral data in a region adjacent to the second region and different from the first region.

6. The spectral data processing apparatus according to claim 1, wherein the third region is a region in which acquisition of the spectral data is performed immediately after acquisition of the second spectral data.

7. The spectral data processing apparatus according to claim 1, wherein the third region is a region in which acquisition of the spectral data is performed at the end among the plurality of regions.

8. A spectral apparatus comprising:
a spectral unit configured to measure spectral data of a sample, and
a spectral data processing apparatus configured to process the spectral data, the spectral data processing apparatus including:
an analyzer configured to perform principal component analysis of spectral data acquired for each of a plurality of regions of a sample,
the analyzer obtaining an eigenvector by performing the principal component analysis of first spectral data of a first region out of the plurality of regions, and performing the principal component analysis of second spectral data of a second region different from the first region out of the plurality of regions using the obtained eigenvector; and
a time comparator configured to compare a required time Te from the termination of acquisition of the second spectral data until acquisition of an eigenvector by performing the principal component analysis of the second spectral data and a required time Ti from the termination of acquisition of the second spectral data until the termination of acquisition of spectral data of a third region different from the first and second regions, wherein
the analyzer performs the principal component analysis of the second spectral data by using the eigenvector obtained by performing the principal component analysis of the first spectral data in a case where Te is longer than Ti, and performs the principal component analysis of the second spectral data by using the eigenvector obtained by performing the principal component analysis of the second spectral data in a case where Te is shorter than Ti or in a case where Te and Ti are equal.

9. A spectral data processing method comprising:
an analyzing step of performing principal component analysis of spectral data acquired for each of a plurality of regions of a sample,
the analyzing step including acquiring an eigenvector by performing the principal component analysis of first spectral data of a first region on the sample or second spectral data of a second region different from the first region on the sample, and performing the principal component analysis of the second spectral data using the obtained eigenvector; and
a comparing step of comparing a required time Te from the termination of acquisition of the second spectral data until acquisition of an eigenvector by performing the principal component analysis of the second spectral data and a required time Ti from the termination of acquisition of the second spectral data until the termination of acquisition of spectral data of a third region different from the first and second regions on the sample, wherein
in a case where Te is longer than Ti, the analyzing step includes performing the principal component analysis of the second spectral data by using the eigenvector obtained by performing the principal component analysis of the first spectral data, and in a case where Te is shorter than Ti or in a case where Te and Ti are equal, the analyzing step includes performing the principal component analysis of the second spectral data by using the eigenvector obtained by performing the principal component analysis of the second spectral data.

10. A non-transitory computer readable storage medium storing computer executable instructions causing a computer to execute a spectral data processing method comprising:
an analyzing step of performing principal component analysis of spectral data acquired for each of a plurality of regions of a sample,
the analyzing step including acquiring an eigenvector by performing the principal component analysis of first spectral data of a first region on the sample or second spectral data of a second region different from the first region on the sample, and performing the principal component analysis of the second spectral data using the obtained eigenvector; and a comparing step of comparing a required time Te from the termination of acquisition of the second spectral data until acquisition of an eigenvector by performing the principal component analysis of the second spectral data and a required time Ti from the termination of acquisition of the second spectral data until the termination of acquisition of spectral data of a third region different from the first and second regions on the sample, wherein in a case where Te is longer than Ti, the analyzing step includes performing the principal component analysis of the second spectral data by using the eigenvector obtained by performing the principal component analysis of the first spectral data, and in a case where Te is shorter than Ti or in a case where Te and Ti are equal, the analyzing step includes performing the principal component analysis of the second spectral data by using the eigenvector obtained by performing the principal component analysis of the second spectral data.

* * * * *